(12) United States Patent
Smahl

(10) Patent No.: US 8,276,947 B2
(45) Date of Patent: Oct. 2, 2012

(54) CONNECTING PIECE COMPRISING A GRIPPING ELEMENT ON THE OUTER SURFACE FOR ROTATING THE CONNECTING PIECE

(75) Inventor: Jarmo Smahl, Nastola (FI)

(73) Assignee: Uponor Innovation AB, Virsbo (SE)

( * ) Notice: Subject to any disclaimer, the term of this patent is extended or adjusted under 35 U.S.C. 154(b) by 0 days.

(21) Appl. No.: 12/712,599

(22) Filed: Feb. 25, 2010

(65) Prior Publication Data
US 2010/0148496 A1    Jun. 17, 2010

Related U.S. Application Data

(63) Continuation of application No. 10/530,225, filed as application No. PCT/FI03/00835 on Nov. 6, 2003, now Pat. No. 7,690,699.

(51) Int. Cl.
F16L 47/00 (2006.01)
(52) U.S. Cl. ............... 285/294.1; 285/285.1; 285/291.1
(58) Field of Classification Search ............... 285/285.1, 285/286.1, 286.2, 291.1, 292.1, 294.1, 354, 285/386, 401, 403; 411/402, 427, 903
See application file for complete search history.

(56) References Cited

U.S. PATENT DOCUMENTS

| | | | |
|---|---|---|---|
| 1,785,406 A | 12/1930 | Cornett | |
| 1,844,023 A | 2/1932 | Terry | |
| 2,385,425 A | 9/1945 | Slezak | |
| 2,933,333 A | 4/1960 | Bredtschneider et al. | |
| 2,958,545 A | 11/1960 | Stelzer | |
| 3,843,169 A | 10/1974 | Wise | |
| 3,854,372 A | 12/1974 | Gutshall | |
| 4,159,134 A | 6/1979 | Shemtov | |
| 4,790,573 A | 12/1988 | Cardozo | |
| 5,090,854 A | 2/1992 | Hafeli et al. | |
| 5,437,481 A | 8/1995 | Spears et al. | |
| 6,050,608 A | 4/2000 | Hattori et al. | |
| 6,198,049 B1 | 3/2001 | Korinek | |
| 6,305,723 B1 * | 10/2001 | Schutz et al. | ................. 285/333 |

(Continued)

FOREIGN PATENT DOCUMENTS
CH    675902    11/1990
(Continued)

OTHER PUBLICATIONS

"Widths Across Flats" *DIN 475—Part 1* (4 pages), Jan. 1984.

*Primary Examiner* — Aaron Dunwoody
*Assistant Examiner* — Fannie Kee
(74) *Attorney, Agent, or Firm* — Occhiuti Rohlicek & Tsao LLP

(57) ABSTRACT

A first element is connected to a first end of the connecting piece and a second element is connected to a second end of the connecting piece. At least one end of the connecting piece is provided with a thread, whereby the connecting piece is connectable for instance to a pipe or fitting with threaded connection. The connecting piece may be made of plastic, for example, the connecting piece is made substantially completely of thermoplast in such a way that the thermoplastic body is provided with a thread. The outer surface of the connecting piece is provided with a gripping member. The gripping member is formed and dimensioned such that it gives way earlier than the connecting member thread and/or basic structure.

10 Claims, 1 Drawing Sheet

U.S. PATENT DOCUMENTS 6,322,108 B1    11/2001    Riesselmann et al.

FOREIGN PATENT DOCUMENTS

| | | |
|---|---|---|
| DE | 26 26 302 | 12/1976 |
| DE | 8121348 | 10/1981 |
| DE | 33 06 192 | 8/1984 |
| DE | 8406562 | 8/1984 |
| DE | 8908805 | 10/1989 |
| DE | 44 30 435 | 3/1995 |
| DE | 195 10 714 | 3/1996 |
| EP | 0 493 316 | 7/1992 |
| EP | 0 556 767 | 2/1993 |
| EP | 0 565 957 | 10/1993 |
| EP | 0 531 709 | 7/1995 |
| EP | 0 744 573 | 5/1996 |
| EP | 0 870 970 | 10/1998 |
| GB | 1 287 779 | 9/1972 |
| GB | 2 327 107 | 1/1999 |
| JP | 9-242729 | 9/1997 |
| JP | 09250675 | 9/1997 |
| JP | 10103569 | 4/1998 |

* cited by examiner

CONNECTING PIECE COMPRISING A GRIPPING ELEMENT ON THE OUTER SURFACE FOR ROTATING THE CONNECTING PIECE

CROSS REFERENCE TO RELATED APPLICATIONS

This application is a continuation of U.S. application Ser. No. 10/530,225, filed on Dec. 5, 2005 now U.S. Pat. No. 7,690,699, which is a 371 National Stage of International Application No. PCT/FI2003/000835, filed on Nov. 6, 2003, which claims the priority of Finnish Patent Application No. 20022005, filed on Nov. 8, 2002. The contents of these applications are hereby incorporated by reference in their entirety.

FIELD OF THE INVENTION

The invention relates to a connecting piece, intended for connecting at least two elements, whereby a first element is connected to a first end of the connecting piece and a second element is connected to a second end of the connecting piece, the body of the connecting piece being mainly of plastic and a metal insert provided with a thread being arranged at at least one end of the connecting piece, whereby at least one element is connectable to the connecting piece with threaded connection and there is at least one gripping element on the outer surface of the connecting piece for rotating the connecting piece or keeping it still upon making the threaded connection.

Further, the invention relates to a connecting piece, intended for connecting at least two elements, whereby a first element is connected to a first end of the connecting piece and a second element is connected to a second end of the connecting piece, the body of the connecting piece being mainly of thermoplast and a thread being formed at at least one end of the connecting piece, whereby at least one element is connectable to the connecting piece with threaded connection and there is at least one gripping element on the outer surface of the connecting piece for rotating the connecting piece or keeping it still upon making the threaded connection.

BACKGROUND OF THE INVENTION

Connecting pieces are used for, for example, connecting a fitting, such as a tap, to a pipe or connecting a pipe to another pipe. If, for instance, a plastic pipe is to be connected to a metal pipe or a metal fitting, it is typical to use a connecting piece with a plastic body to the first end of which a plastic pipe is connected. The second end of the plastic body, in turn, is equipped with a metal insert provided with a thread, to which a metal pipe or a metal fitting is connected. Such solutions are disclosed for example in DE 8 908 805, EP 0 744 573, JP 10 103 569, JP 09 250 675, EP 0 556 767, U.S. Pat. No. 4,790, 573, DE 19 510 714, EP 0 493 316 and U.S. Pat. No. 5,437, 481.

Also EP 0 565 957, CH 675902, EP 0 531 709 and DE 8 406 562 disclose connecting pieces in which there is a metal insert arranged inside a plastic body. The outer surface of the metal insert is formed hexagonal, whereby this hexagonal outer surface can be gripped with a tool upon making the threaded connection.

EP publication 0 870 970 discloses an adapter with which a pipe of a water system, for example, can be connected to a system element. The adapter comprises a body having a seat for a pipe and a metal insert provided with a thread for connecting it to the system element. The outer surface of the adapter is provided with longitudinal ribs and a robust external thread to which a ring nut can be screwed to tighten the connection between the adapter and the pipe.

DE publication 3 306 192 discloses a connecting piece by means of which a plastic pipe is connected to a metal fitting. The interior of the plastic body of the connecting piece is equipped with a metal insert provided with a thread, the fitting being attached in the insert. The outer surface of the plastic body is provided with grooves, which makes it easier to keep the connecting piece immovable when the fitting is screwed to the connecting piece.

DE publication 4 430 435 discloses an elbow-like connecting piece for connecting a pipe to a metal fitting. There is a bend part in the connecting piece, the first end of the bend part comprising a socket for attaching the pipe and the second end comprising a socket having an insert provided with a thread. The outer surface of the second end comprises longitudinal ribs.

DE publication 2 626 302 mentions a connecting piece made of synthetic resin, having an external thread at the first end for connecting the connecting piece to a metal pipe, for instance. The second end of the connecting piece, in turn, comprises a tightener part for connecting the connecting piece to a pipe made of synthetic resin. On the outer surface of the connecting piece there is a nut, whereby the connecting piece can be easily gripped with a tool. Disadvantages of such a solution have been reported to be that the external thread part gets easily broken and damaged, whereby the external thread connection begins to leak, and in addition, the nut part wears and gets slanted easily. As a solution to these problems, the publication suggests that the external thread part and the nut part of the connecting piece be made of metal.

BRIEF DESCRIPTION OF THE INVENTION

An object of the present invention is to provide an improved connecting piece of a novel type.

The connecting piece according to the invention, provided with a metal insert, is characterized in that the gripping element comprises at least two straight portions on opposite sides of the connecting piece, and that there is a rounded portion between adjacent straight portions, whereby the gripping element is formed such that it gives way earlier than the thread and/or the basic structure of the connecting piece.

The connecting piece according to the invention, made of thermoplast, is characterized in that the gripping element comprises at least two straight portions on opposite sides of the connecting piece, and that there is a rounded portion between adjacent straight portions, whereby the gripping element is formed such that it gives way earlier than the thread of the connecting piece.

An essential idea of the invention is that at least one end of the connecting piece is provided with a thread, whereby the connecting piece is connectable for instance to a pipe or a fitting with threaded connection. The connecting piece may be made of plastic, for example, in such a way that at least the other end of the plastic body of the connecting piece is equipped with a metal insert provided with a thread, or the connecting piece is made substantially completely of thermoplast in such a way that a thread is formed in the thermoplastic body. Further, a gripping element is arranged on the outer surface of the connecting piece for rotating the connecting piece or keeping it still upon making the threaded connection. The gripping element is formed and dimensioned such that it gives way earlier than the thread and/or the basic structure of the connecting piece, for instance at the connection point of the insert and the plastic body. Thus, upon making the threaded connection, it is not possible to use too great a tightening force. Using too great a tightening force would result in the basic structure of the connecting piece to get damaged or the threads to get damaged, which, in turn, would cause a leak point at the threads, for example.

The idea of one embodiment is that the gripping element comprises at least two straight portions, i.e. gripping surfaces, on opposite sides of the connecting piece, being intended for a tool, such as an adjustable wrench, a set wrench, pipe tongs or the like tool. Thus, the gripping element can be arranged to give way, for instance in such a way that the portions between adjacent gripping surfaces are formed rounded. In this case, it is possible to grip the connecting piece tightly with a tool, and when the tool turns around relative to the connecting piece, the outer surface of the connecting piece will not get substantially damaged. The gripping element can be formed to comprise, for example, six straight portions, like a nut. Further, the gripping element can be formed of ribs that are in the direction of the periphery and arranged on the outer surface of the connecting piece. Ribs on the outer surfaces have the advantage that when the connecting piece is injection-moulded, the plastic part of the connecting piece cools relatively quickly and no stresses are generated inside the plastic piece during the casting. Further, the ribs strengthen the wall structure, whereby it is not necessary to make the wall of the plastic piece body very thick. Since the wall needs not be thick, substantially no thick points are formed in the plastic piece during casting which could generate suction points in the plastic material during casting or cavities in the finished piece. The outer surface of the metal insert in the connecting piece may be provided, in the direction of the periphery of the insert, with ribs or grooves which improve the attachment of the metal insert and the plastic part to each other. Thus, the ribs outside the connecting piece can be arranged at the same point as the ribs of the metal insert. Thus, the thickness of the plastic part wall of the connecting piece remains substantially uniform over the whole portion of the connecting piece, which, for its part, decreases stresses generated inside the plastic piece during casting, because the plastic cools evenly as the wall is of substantially uniform thickness over the whole area.

BRIEF DESCRIPTION OF THE FIGURES

The invention will now be described in more detail in the attached drawings, of which

For the sake of clarity, the invention is illustrated simplified in the figures. Similar parts are denoted with the same reference numerals.

DETAILED DESCRIPTION OF THE INVENTION

Figure 1:
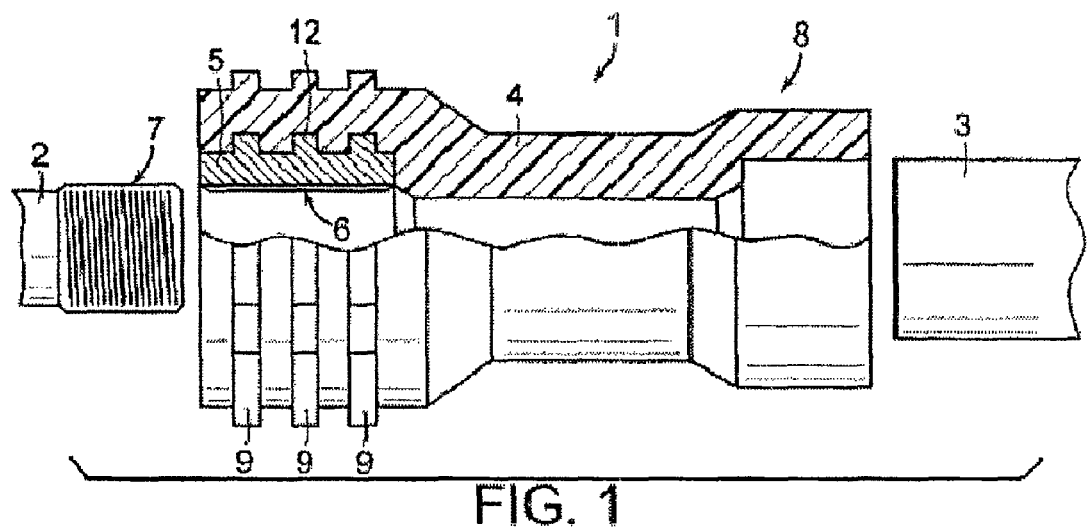
FIG. 1 shows schematically a side view and partial section of a connecting piece.

FIG. 1 shows a connecting piece 1. The connecting piece 1 is used between a first element 2 and a second element 3 to connect them. The first element 2 may be, for instance, a metal pipe or a fitting, such as a tap or the like, and the second element 3 may be a plastic pipe, for instance. The connecting piece 1 may be straight, as illustrated in FIG. 1, or it may be a bend, for example. Further, the connecting piece 1 may be a T branch, for example, in which case three elements are connected to each other with it. Hence, the appearance and the object of use of the connecting piece 1 may vary even to a large extent.

The body 4 of the connecting piece 1 is preferably of plastic, such as polyethylene PE, polypropylene PP, cross-linked polyethylene PEX, polyamide PA, polysulphone PSU or polyphenyl sulphone PPSU. A first end of the body 4 of the connecting piece 1 is provided with a metal insert 5. The metal insert 5 may be, for instance, of brass or other metal suitable for the purpose. There is a thread 6 inside the metal insert 5, whereby the first element 2 provided with an external thread 7 may be connected to the connecting piece 1 with threaded connection. The metal insert 5 may also be formed such that the thread 6 is arranged on its outer surface, in which case the first element 2 may have internal threads that are screwed upon the external threads of the metal insert.

A second end of the connecting piece 1 is provided with a socket 8 for connecting the connecting piece 1 and the second element 3 to each other. The socket 8 may be provided for example with electric welding means with which a plastic pipe, for example, can be connected to the plastic body 4 of the connecting piece 1. Further, different seals and adhesives may be used for connecting a plastic pipe to the connecting piece 1 in a manner known per se. On the other hand, also the second end of the connecting piece 1 may be provided with a metal insert, in which case the connecting piece 1 may be used for example for connecting two metal pipes to each other or for connecting a metal pipe and a fitting.

Figure 2:
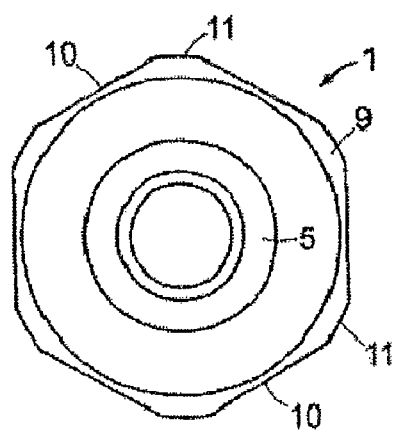
FIG. 2 shows an end view of the connecting piece of FIG. 1.

The outer surface of the connecting piece 1 is provided with ribs 9 in the direction of the periphery. The ribs 9 strengthen the structure of the wall of the body 4. As seen from FIG. 2, the ribs 9 are formed such that they have straight portions 10 on opposite sides of the connecting piece 1 that function as gripping surfaces for an adjustable wrench, set wrench, pipe tongs or the like tool. Thus, making the threaded connection is facilitated with ribs 9. There are preferably six straight portions, whereby the shape of the outer periphery of the ribs 9 corresponds to the shape of a nut. Between the adjacent straight portions 10, however, there is a rounded portion 11. Due to the rounded portions 11, the gripping surface formed by the ribs 9 is not very large, whereby utilizing ribs 9 does not allow too great a tightening force to be directed at the threaded connection. If the tightening force grows too great, the tool is turned around relative to the connecting piece 1 due to the rounded portion 11, and the threaded connection is not tightened too much.

The outer surface of the metal insert 5 may be provided with ribs 12 in the direction of the periphery, by means of which the attachment between the plastic material of the body 4 and the metal insert 5 is improved. The ribs 9 outside the body 4 are preferably arranged at substantially the same points as the ribs 12 of the metal insert 5. Thus, the wall of the body 4 has substantially uniform thickness over the whole area.

Figure 3:
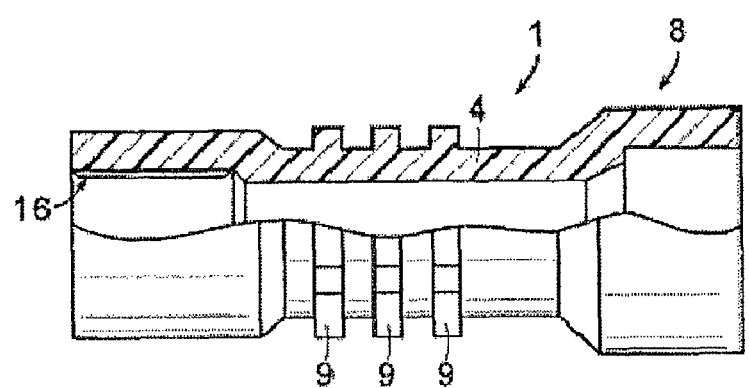
FIG. 3 shows schematically a side view and partial section of a second connecting piece.

FIG. 3 shows a connecting piece 1 which is made substantially completely of thermoplast, such as polyethylene PE, cross-linked polyethylene PEX, polyamide PA, polysulphone PSU or polyphenyl sulphone PPSU. One end of the body 4 of the connecting piece 1 is provided with a thread 16, whereby the connecting piece 1 and the second element 3 are connectable to each other with threaded connection. The other end of the connecting piece 1 is provided with a socket 8. The other end of the connecting piece 1 may also be provided with a thread 16 (not shown), whereby, in other words, an element can be connected to both ends of the connecting piece 1 with a thread.

Also the embodiment of FIG. 3 has ribs on the outer surface of the connecting piece 1. In this case, too, the ribs 9 are provided with straight portions and, between them, rounded portions, whereby the appearance of the ribs 9 correspond to the ribs in FIGS. 1 and 2. When the connecting piece 1 is substantially completely of thermoplast, the ribs 9 are arranged preferably behind the threads 16 in the axial direction of the connecting piece 1, as shown in FIG. 3. Thus, again, subjecting the threads 16 to too great a tightening force can be avoided.

The drawing and the related description are only intended to illustrate the idea of the invention. The details of the invention may vary within the scope of the claims. Thus, the gripping element may be different from the nut-shaped ribs shown in the figures. The gripping element may be, for example, continuously of the shape of a nut. Further, the gripping element may be formed of external ribs in the direction of the longitudinal axis of the connecting peace 1, or the gripping element may be formed of a single rib or protrusion which can be gripped with the gripping surface of a wrench, for example. Due to the gripping element on the outer surface of the connecting piece 1, the outer surface of the connecting piece 1 is not rotationally symmetrical, i.e. the outer surface of the connecting piece 1 is not of a shape of a smooth cylinder, for example. The gripping element can be arranged at any point in the connecting piece. Preferably the gripping element is in the vicinity of the thread. If there are several threads, there may be a gripping element in the vicinity of each of them. On the other hand, there may be more places with gripping elements than there are threads in the connecting piece.

Weakening of the gripping element may be created either by selecting the material appropriately or by dimensioning the structure of the gripping element to be sufficiently thin, for example. For instance, the ribs in the direction of the periphery may be made so thin that they give way when the connecting piece 1 is subjected to too great a tightening force. Further, also a nut may have a rounded portion between straight portions, as shown in the attached figures with the ribs. Further, the material of the gripping element may be partly or completely of such weak material that it gives way when it is subjected to too great a force. For example, the body 4 of the connecting piece 1 may be made of material with added reinforcements, such as glass fibre, and the gripping element may be made of corresponding material with no added reinforcements.

The invention claimed is:

1. A connecting piece, intended for connecting at least two elements, a first element connected to a first end of the connecting piece and a second element connected to a second end of the connecting piece, the connecting piece comprising:
   a body mainly of thermoplast;
   a thread positioned at at least one end of the connecting piece, the thread configured such that at least one of the first and second elements can be connected to the connecting piece by a threaded connection; and
   at least one gripping element disposed around an outer surface of the connecting piece manipulatable for allowing either the connecting piece to rotate relative to at least one of the first and second elements or at least one of the first and second elements to rotate relative to the connecting piece while making the threaded connection, the gripping element comprising:
   at least two straight portions as seen when viewed in a plane transverse to a longitudinal axis of the connecting piece, the at least two straight portions arranged such that the two straight portions on opposite sides of the connecting piece are parallel, the straight portions forming gripping surfaces for a tool;
   the gripping element being formed of two or more ribs disposed circumferentially around the connecting piece, the ribs having a substantially equal width, and each rib protruding outwards from the outer surface of the connecting piece;
   whereby the gripping element is formed such that a tool surrounding the gripping element slips before the thread of the connecting piece gets damaged.

2. A connecting piece according to claim 1, wherein the gripping element comprises six straight portions.

3. A connecting piece according to claim 1, wherein the gripping element further comprises a smooth portion disposed between adjacent straight portions, and the smooth portion is a rounded portion.

4. A connecting piece according to claim 3 wherein a circumferential length of the smooth portion is about one-third as long as a circumferential length of an adjacent straight portion.

5. A connecting piece according to claim 1, wherein the thread is an internal thread.

6. A connecting piece, intended for connecting at least two elements, a first element connected to a first end of the connecting piece and a second element connected to a second end of the connecting piece, the connecting piece comprising:
   a body mainly of thermoplast;
   a thread positioned at at least one end of the connecting piece, the thread configured such that at least one of the first and second elements can be connected to the connecting piece by a threaded connection; and
   at least one gripping element disposed around an outer surface of the connecting piece manipulatable for allowing either the connecting piece to rotate relative to at least one of the first and second elements or at least one of the first and second elements to rotate relative to the connecting piece while making the threaded connection, the gripping element comprising:
   at least two straight portions as seen when viewed in a plane transverse to a longitudinal axis of the connecting piece, the at least two straight portions arranged such that the two straight portions on opposite sides of the connecting piece are parallel, the straight portions forming gripping surfaces for a tool;
   the gripping element being formed of two or more ribs disposed circumferentially around the connecting piece, the ribs having a substantially equal width, and each rib forming a continuous ring around the outer surface of the connecting piece;
   whereby the gripping element is formed such that a tool surrounding the gripping element slips before the thread of the connecting piece gets damaged.

7. A connecting piece according to claim 6, wherein the gripping element comprises six straight portions.

8. A connecting piece according to claim 6, wherein the gripping element further comprises a smooth portion disposed between adjacent straight portions, and the smooth portion is a rounded portion.

9. The connecting piece according to claim 8 wherein a circumferential length of the smooth portion is about one-third as long as a circumferential length of an adjacent straight portion.

10. A connecting piece according to claim 6, wherein the thread is an internal thread.

* * * * *